UNITED STATES PATENT OFFICE.

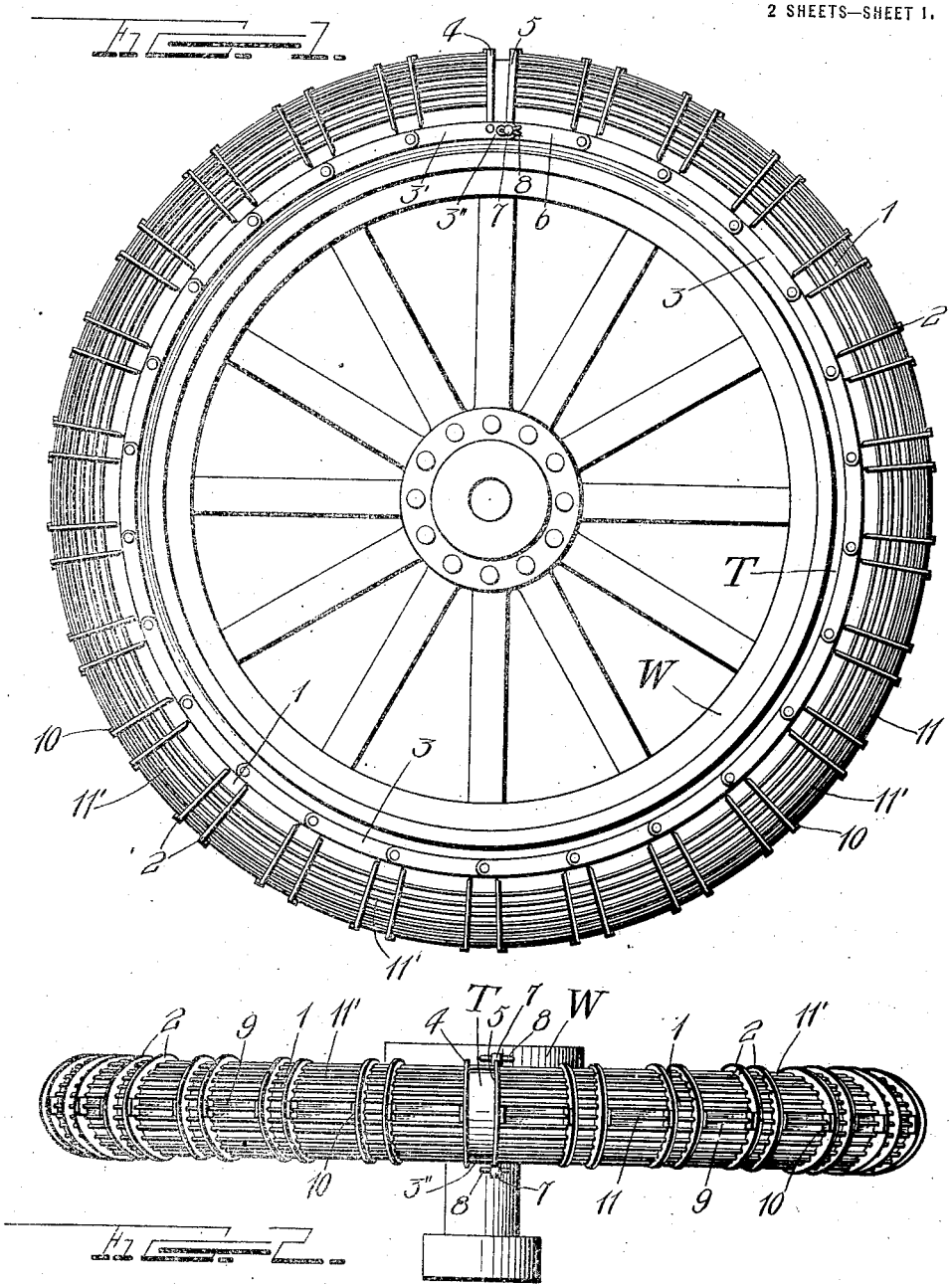

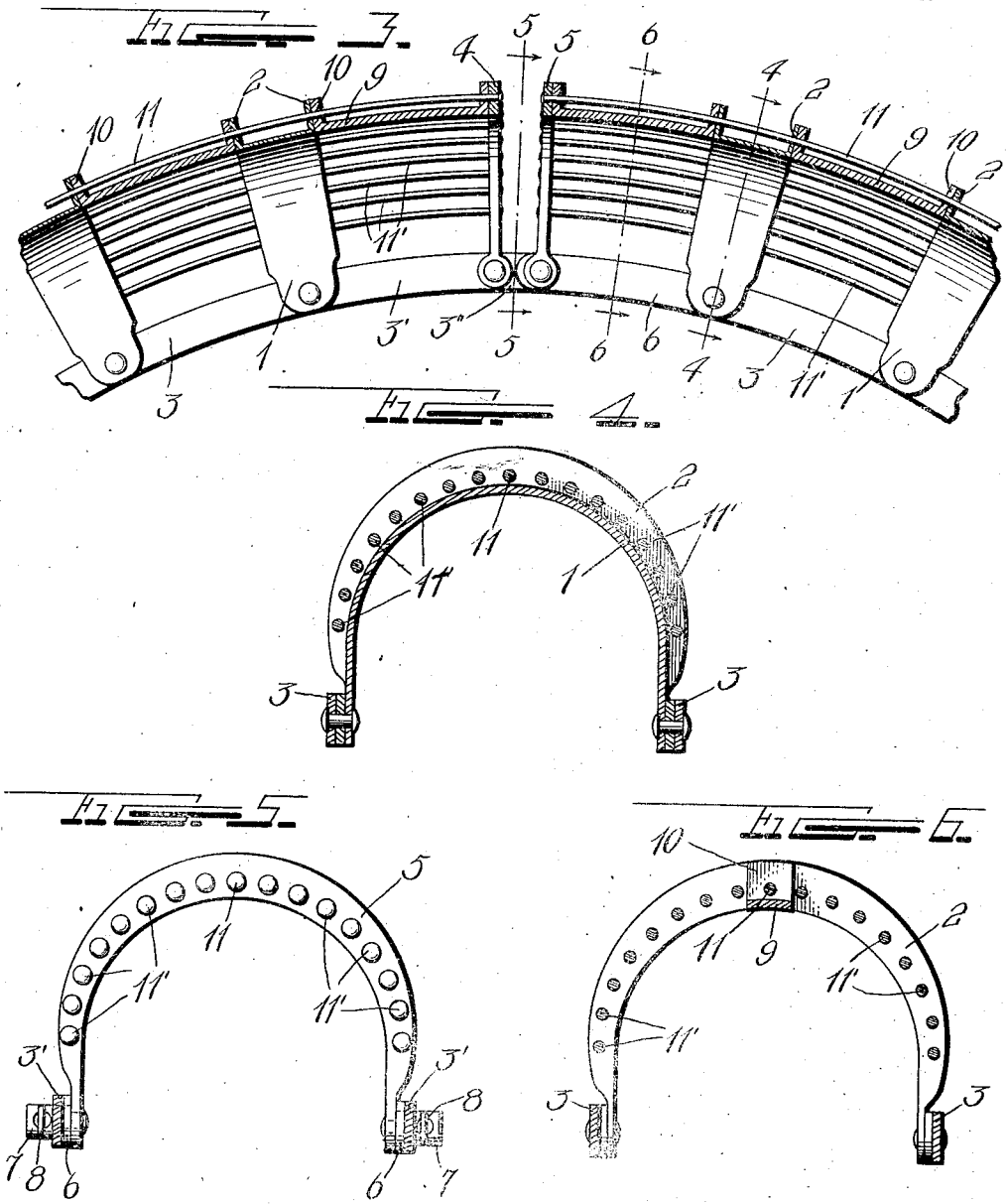

JOHN W. CLONINGER, OF PEARL, ILLINOIS.

TIRE-ARMOR.

1,148,576.  Specification of Letters Patent.  Patented Aug. 3, 1915.

Application filed November 12, 1914. Serial No. 871,725.

*To all whom it may concern:*

Be it known that I, JOHN W. CLONINGER, citizen of the United States, residing at Pearl, in the county of Pike and State of Illinois, have invented certain new and useful Improvements in Tire-Armors; and I do declare the following to be a full, clear, and exact description of the invention, such as will enable others skilled in the art to which it appertains to make and use the same.

My invention relates broadly to improvements in vehicle tires and more particularly to armors and anti-skid devices therefor.

The main object of the invention is to provide comparatively simple construction for effectively guarding an automobile tire against injury from rocks or other obstructions in the road bed.

In carrying out the above object, a plurality of rings are provided which extend circumferentially around the tire, transverse spacing members being employed for holding said rings in fixed relation.

A further object of the invention is to construct these spacing members in such a manner as to cause them to act simultaneously as fastening means for the rings and as road gripping blades for preventing skidding on muddy roads.

Other objects are to provide simple structure for spacing the numerous transverse spacing members circumferentially, and to form a simple but efficient connection between the meeting ends of the armor, the latter being constructed in the form of a split ring.

With the above and minor objects in view, the invention resides in certain novel features of construction and combination hereinafter described and claimed and shown in the drawings wherein:

Figures 1 and 2 are respectively side and edge views of my improved armor applied to use upon an automobile tire: Fig. 3 is a vertical longitudinal section through a portion of the armor: Fig. 4 is a transverse section as seen on the plane of the line 4—4 of Fig. 1: Fig. 5 is a similar view taken on the line 5—5 of Fig. 1: and Fig. 6 is still another transverse section taken on the line 6—6 of Fig. 1.

In the embodiment illustrated in the accompanying drawings forming part of this application, an automobile wheel W is shown (in the first two figures), said wheel being here shown as equipped with a common type of pneumatic tire T. It is the object of the present invention, to shield this tire against injury. For carrying out this purpose, I provide a number of transverse arched spacing members 1 which embrace the tread and sides of the tire and which are provided with outwardly projecting flanges 2 on their opposite edges, said flanges being provided with spaced openings, as shown. The inner ends of the members 1 are connected by a plurality of links 3, as clearly seen in Fig. 1, said links being pivoted to said inner ends.

It will be noted that two of the spacing members 1 are spaced approximately twice as far as the remaining members, and that at this point transverse arches 4 and 5 are provided, the latter being connected to the adjacent member 1 by links 6, and having laterally extending studs 7, the latter projecting through openings in links 3' which connect the arch 4 with the adjacent spacing member 1, said links 3' being continued past their connections with said arch 4, as seen at 3'', thereby forming eyes. For the purpose of preventing the removal of the links 3' from the studs 7, cotterpins 8 are passed through said studs.

Interposed between the various transverse arched members above described, is an annular series of longitudinal spacing elements 9 whose opposite ends are provided with upturned perforated ears 10, the perforations in the latter alining with the central perforations in the flanges 2. With the parts in this position, a split ring 11 is passed through the alined perforations in the elements 9 and flanges 2, and is secured at its opposite ends to the members 4 and 5, as clearly shown in Fig. 3.

A device constructed, as above described, operates to great advantage as an anti-skidding device for use on muddy roads, although a tire is not protected to a great extent against puncture by such construction. Therefore, it becomes expedient to provide other split rings 11' which likewise extend circumferentially around the tire and have their ends secured to the arches 4 and 5. These rings 11' may be spaced suitable distances or, if desired, may be disposed in contact with each other, the construction illustrated being preferable.

The rings 11 and 11' are constructed of spring steel wire, thereby allowing the same to yield inwardly as the tire yields, thus preventing the resiliency of the latter from being decreased. It will be understood that the members 1, 4, and 5 are likewise free to move inwardly, this being due to their link connections.

From the foregoing description, taken in connection with the accompanying drawings, it will be seen that a comparatively simple armor has been provided, yet one which possesses a number of advantageous features.

I claim:

A tire armor comprising a plurality of transverse arched plates adapted to embrace a tire and to be spaced circumferentially thereon, transverse flanges formed integrally with and projecting outwardly from the transverse edges of said plates, said flanges having a series of circumferentially alined openings, and a plurality of spaced concentric rings encircling the arched plates and passing through the openings in the flanges thereof, said rings constituting a tread for the tire, and the flanges acting as anti-skid members.

In testimony whereof I have hereunto set my hand in presence of two subscribing witnesses.

JOHN W. CLONINGER.

Witnesses:
J. O. CLONINGER,
W. S. FOREMAN.